United States Patent [19]

Miller et al.

[11] Patent Number: 4,464,580
[45] Date of Patent: Aug. 7, 1984

[54] HYDRO-ELECTRIC TURBO-MACHINE

[75] Inventors: Helmut Miller, Bergdietikon, Switzerland; Kurt Baumann, Kressbronn; Franz Halder, Ravensburg, both of Fed. Rep. of Germany; Noël Meystre, Meilen, Switzerland

[73] Assignee: Escher Wyss Limited, Zurich, Switzerland

[21] Appl. No.: 358,857

[22] Filed: Mar. 17, 1982

[30] Foreign Application Priority Data

Apr. 7, 1981 [CH] Switzerland .................. 2334/81

[51] Int. Cl.³ .................. F16J 15/00; F16J 15/34
[52] U.S. Cl. .................. 290/52; 290/43; 290/54; 277/71; 277/74; 74/476
[58] Field of Search .......... 290/52, 43, 54; 74/475, 74/476, 491; 116/28.1; 277/58, 74, 152, 164, 71, 75, 96.1, 152, 153; 415/175, 91, 122 A, 170 R, 172 A, 173 R

[56] References Cited

U.S. PATENT DOCUMENTS 3,346,265 10/1967 Rhoads et al. .................. 277/58
3,606,568 9/1971 Braikevitch et al. .......... 277/74 X
3,957,276 5/1976 Wiese ........................... 277/96.1
4,191,064 3/1980 Houk et al. .................. 74/476 X
4,268,044 5/1981 Killian et al. ................ 277/71 X

FOREIGN PATENT DOCUMENTS 1151155 7/1963 Fed. Rep. of Germany .

Primary Examiner—J. V. Truhe
Assistant Examiner—Terry Flower
Attorney, Agent, or Firm—Werner W. Kleeman

[57] ABSTRACT

In a turbo-machine having a rotor member movable relative to a stationary housing member there is provided a substantially ring-shaped or annular seal between both of these members and serves to seal pressurized water from an external space or region. One of both of these members possesses a sealing surface against which there is pressed a sealing body of the seal which is inserted into the other member, the sealing body being for instance constituted by a lip seal. Improved lubrication, reduced friction and enhanced service life of the seal is attained in that, the sealing surface has fed thereto a friction-reducing liquid, for instance by means of radial grooves provided in the sealing surface or by means of bores opening into the sealing surface.

23 Claims, 16 Drawing Figures

HYDRO-ELECTRIC TURBO-MACHINE

BACKGROUND OF THE INVENTION

The present invention relates to a new and improved construction of a hydro-electric turbo-machine.

Generally speaking, the hydro-electric turbo-machine of the present development is of the type containing a rotor revolving within a stationary housing or casing and a substantially ring-shaped seal or sealing arrangement for sealing the water flowing through the turbo-machine between corresponding parts of the rotor and the housing. One of the parts constitutes a rigid counter part having a sealing surface against which there is pressed at least one sealing body formed of a resilient or compliant material and mounted in the other part.

With such type of hydro-electric turbo-machines, for instance water turbines, storage pumps, pump turbines or the like, possessing a large diameter of the runner or the hub assembly, for instance in the meter range, it is necessary to seal the water which is pressurized. Sealing of such pressurized water is accomplished, for instance, at the circumference of the runner, in order to prevent penetration of such pressurized water into an electric generator arranged, for example at the outer rim of the runner, or into the hub assembly, the diameter of which likewise can be in the meter-range, in order to prevent such pressurized water from reaching the bearings of the runner shaft. These bearings are located, for instance, at the central region or so-called bulbous portion of the housing or casing.

Seals for small diameters, for instance in the centimeter or deci-centimeter range, are already known in multifarious constructions. For instance, they are known to the art as shaft seals or retaining rings. As a general rule, they adequately satisfy the imposed requirements as to sealing tightness, good lubrication properties and sufficient longevity for those conditions which are encountered at these regions.

However, these seals which are entirely satisfactory for use when working with small diameters are no longer adequate for sealing revolving parts or components of large diameter and for complying with the thus prevailing requirements. For instance, for tube turbines there arise relative velocities of the revolving components or parts in a range considerably above 10 m/s, for instance in the order of magnitude of 50 m/s, which produce appreciable frictional forces.

In such instances, the wear of the sealing body therefore is appreciable and the service life or longevity of the seals is low. The deformations arising when working with large diamaters lie in part in the order of the millimeter range, so that considerably greater tolerances must be compensated than for the known seals used with smaller diameters. The use of the prior art seals with turbo-machines having large diameters therefore was heretofore unsatisfactory.

It has already been proposed to solve these problems in various ways. For instance, in U.S. Pat. No. 3,606,568, granted Sept. 20, 1971, there is described a water turbine whose seal consists of a double-bead ring. Both of these beads are hydraulically pressed against a sealing surface. While there is possible a certain tolerance compensation, nonetheless the frictional forces are still appreciable and the rapid wear of the sealing beads results in too low service life and a premature leakiness or untightness of the seal arrangement.

In German Pat. No. 1,151,155, published July 4, 1963, there is disclosed a ring-shaped seal possessing a lip seal, the lip member of which is pressed by the pressure of the medium which is to be sealed against a sealing surface. Also such type of seal construction experiences much too great wear and displays insufficient service life.

In the U.S. Pat. No. 3,346,265, granted Oct. 10, 1967 there is disclosed a double-lip seal arrangement for sealing oil in large-diameter machines. Also in this case there is required frequent exchange of the sealing arrangement because of wear and the like.

Also in U.S. Pat. No. 4,191,064, granted Apr. 15, 1980 there is disclosed a spring-reinforced lip seal having a diameter greater than one meter, but such seal arrangement equally does not possess an improved running characteristics.

SUMMARY OF THE INVENTION

Therefore, it is a primary object of the present invention to provide a new and improved construction of a hydro-electric turbo-machine equipped with a sealing arrangement which is not afflicted with the aforementioned drawbacks and limitations of the prior art constructions.

Another and more specific object of the present invention aims at avoiding the aforementioned drawbacks of the state-of-the-art constructions and, specifically providing a turbo-machine having an improved sealing of the rotor with respect to the housing or casing, and which particularly displays reduced friction and wear, a greater service life, improved lubrication and an improved tightness or sealing properties over longer service times with increased tolerances.

Still a further significant object of the present invention is directed to a new and improved construction of hydro-electric turbo-machine equipped with a novel sealing arrangement which is relatively simple in construction and design, extremely economical to manufacture, highly reliable in operation, and possesses enhanced sealing characteristics and service life.

Now in order to implement these and still further objects of the invention, which will become more readily apparent as the description proceeds, the invention is manifested by the features that the counter part is constructed such that its sealing surface can have infed thereto, from the location of the counter part, a friction-reducing liquid.

As the friction-reducing liquid there can be advantageously used the water which itself is to be sealed, and the infeed of such water can be accomplished by grooves or the like provided at the sealing surface. Such grooves or equivalent structure possess a predominant directional component in the shut-off direction of the water which is to be sealed, for instance in the case of a sealing surface extending perpendicular to the axis of the turbo-machine, the grooves are arranged substantially radially in the sealing surface, or in the case of a substantially cylindrical jacket-shaped sealing surface the grooves are located essentially axially in the sealing surface.

Additionally, it can be advantageous to arrange at the sealing surface of the counter part a number of ceramic bodies or body members whose contact or impact edges form the grooves or equivalent friction-reducing liquid infeed means.

Instead of using grooves the infeed of the friction-reducing liquid, for instance the infeed of river water from a water guide arrangement, also can be, however, accomplished by means of bores provided at the counter part and which open into the sealing surface. In this way additional foreign particles or contaminants contained in the liquid medium, for instance sand or grit in the pressurized water, can be kept away from the seals, so that the service life of the seals can be further improved.

An advantageous construction of the sealing bodies is manifested by the provision of lip seals, whose sealing lips are pressed by their inherent elasticity or by the action of a spring or resilient insert against the sealing surface, or by hose seals which are exposed to an excess pressure.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
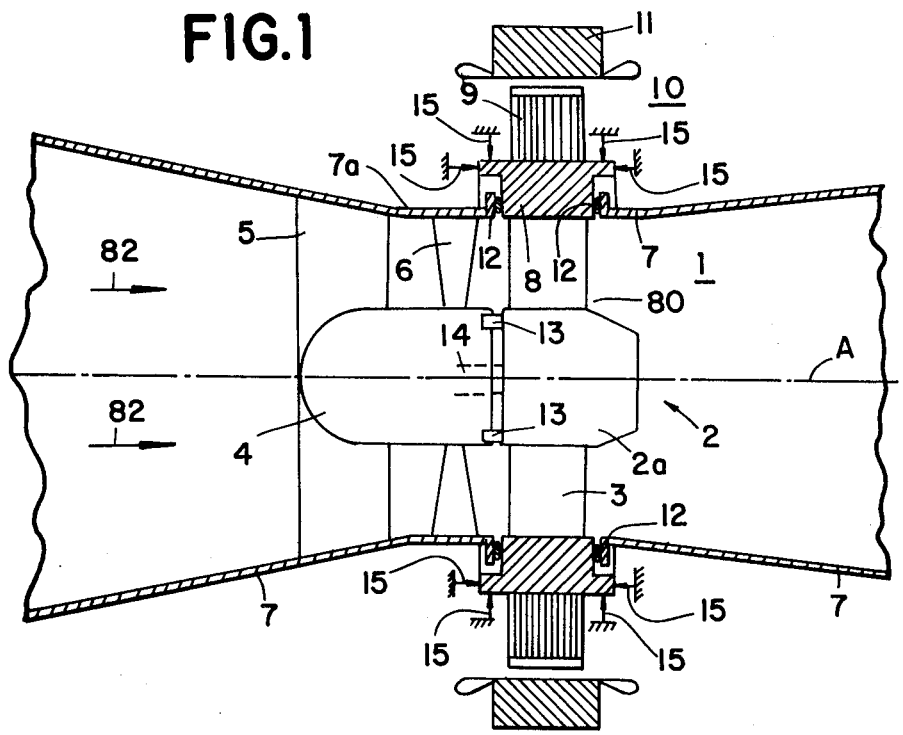
FIG. 1 illustrates a water turbine with seals between the rotor-outer rim and the housing or casing.

Describing now the drawings, in FIG. 1 there has been illustrated in schematic sectional view a hydraulic power plant containing a water turbine 1 which may have any known design and which is constructed as a socalled outer rim-tube turbine in the exemplary embodiment. This water turbine 1 essentially comprises a rotor 80 possessing an impeller or runner 2 with stationary or adjustable blades or blading 3 as well as a central inflow body member or nose cone 4 which is arranged in the flow direction of the water, indicated by the arrows 82 of FIG. 1, forwardly or upstream of the hub assembly 2a of the runner 2 and contains stationary or movable vanes or blades 6. The inflow body 4, which serves for streamlining the flow, is secured by means of radial partition walls 5 in an outer tube 7a of the turbine housing. These partition walls 5 extend axially in the water flow direction 82. The runner 2 is externally surrounded by a rim 8 connected with the blades 3, this rim 8 being mounted at suitable bearings, which have been merely schematically indicated by reference character 15. Attached to the rim 8 is the rotor 9 of an electric generator 10. This rim-mounted rotor 9 is surrounded, in turn, by a stator 11 of the electric generator 10. Between the rim or rim member 8 and the turbine housing or casing 7 there are provided to both sides of such rim 8 seals or sealing means 12 which are constructed as ring-shaped or annular elements having a diameter of several meters. These seals 12 serve to seal the outer region containing the electric generator 10 from the water contained internally of the tube turbine 1, this water being at a pressure of up to several bars. Analogous ring-shaped seals 13 are provided between the hub assembly 2a of the runner 2 and the inflow body member 4. These ring-shaped seals 13 seal the interior of the inflow body member 4 and the bearings of the shaft 14 likewise from the pressurized water in the tube turbine 1. Also in this case the diameter of the substantially ring-shaped seals 13, as a rule, is greater than 1 meter.

The lengthwise axis A of the water turbine 1, in the exemplary illustrated embodiment, extends essentially horizontally and during operation of this water turbine 1 there arise velocities in the order of 20 to 100 m/s. The deformations which occur during rotation of the runner 2 are, in part, in the order of above 1 mm.

Figure 2A:
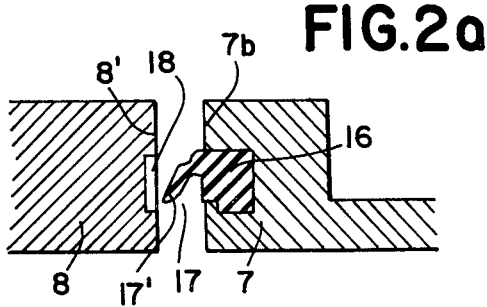
FIG. 2a illustrates a first exemplary embodiment of a seal or sealing arrangement in a spread apart condition.
Figure 2B:
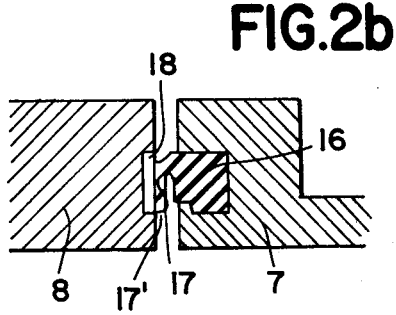
FIG. 2b illustrates the exemplary embodiment of sealing arrangement depicted in FIG. 2a in its work or effective position.

In order to insure for a positive sealing action with such tolerances and velocities over longer time spans, without the occurrence of any appreciable leakage, the substantially ring-shaped seals 12 and 13 are constructed, for instance, in accordance with the sectional illustrations thereof depicted in FIGS. 2a and 2b In particular, FIG. 2a illustrates the seal with the runner rim 8 end portion 7b of the turbine housing 7 spread apart. FIG. 2b illustrates the same parts in their work or effective position. Inserted into the end surface or end portion 7b of the turbine housing 7 is a seal or sealing body 16 which is constructed as a ring-shaped or annular lip seal. The sealing lip 17 of this stationary lip seal 16 extends in the direction of the interior of the turbine 1, in other words towards the liquid medium which is to be blocked or shut-off. The rotating outer rim 8 forms at its side surface or end face a substantially circular ring-shaped sealing surface 8'. At the height of the sealing lip 17 there are provided in such sealing surface 8' a plurality of radially extending grooves 18 or equivalent structure which extend at least over the entire contact surface of the sealing lip 17 at the sealing surface 8'. By means of such grooves 18 there is accomplished an infeed of water from the counter part, here the rim 8 containing the sealing surface 8'. Such water infeed via the grooves 18 appreciably reduces the friction between the sealing lip 17 and the counter part 8 and brings about an appreciable prolongation of the service life, especially that of the sealing body. Moreover, the reduced frictional forces are maintained practically over the entire service life of the seal arrangement, so that the running properties are decisively improved.

Between the counter surface, here constituted by the sealing surface 8', provided with the grooves 18 and the sealing lip 17 which is pressed by its inherent elasticity or else augmented by the action of a spring insert, merely generally symbolically indicated in FIGS. 2a and 2b by reference characters 17', and also by the pressure of the water against such counter surface or sealing surface 8', there enters such a thin lubricant film that there occurs a pronounced reduction in the frictional forces, however, the leakage of the water still can be maintained extremely small. In particular, appreciably smaller frictional forces and considerably longer service life can be obtained in comparison to a possible construction with grooves in the sealing body itself and a smooth sealing surface. This is predicated upon the fact, which was either not heretofore recognized or else not taken into account, that the infeed of lubricant from the counter part causes an improved distribution of the liquid over the entire surface of the sealing lip, something which is not true to the same degree if the liquid infeed is instead accomplished by means of grooves in the sealing lip.

Figures 3A, 3B:
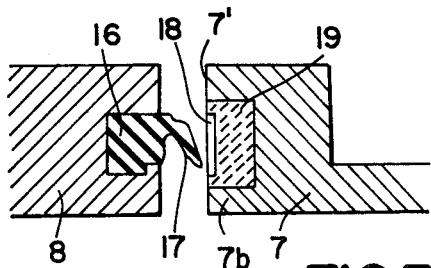
FIG. 3a illustrates a further exemplary embodiment of a seal arrangement provided with a ceramic sealing surface and shown in its spread apart condition.
FIG. 3b illustrates the embodiment of seal arrangement depicted in FIG. 3a in its work or effectual position.

While with the exemplary embodiment of sealing arrangement according to FIGS. 2a and 2b there is used a stationary sealing body 16 and a rotating sealing surface 8', with the exemplary embodiment of FIGS. 3a and 3b the sealing body 16 is embedded in the rotating rim member 8. In this case the housing end or end portion 7b serves as the counter part. At this counter part 7b there are embedded a plurality of ceramic body members or bodies 19 in a manner such that their outer surfaces or faces 19a (FIG. 5) form the sealing surfaces and their contact or impact edges 19b the grooves 18. In this arrangement there is not required any special milling or other machining of grooves. Due to the provision of the ceramic bodies 19 it is possible to even further enhance the service life of the seals.

It is here remarked that both with the embodiment containing stationary sealing bodies and sealing surfaces possessing rotating grooves (FIGS. 2a and 2b) and also with the embodiment containing rotating sealing bodies and stationary sealing surfaces provided with grooves (FIGS. 3a and 3b), the results were found to be appreciably better than with the conventional heretofore known seals of large diameter. What is important is that the liquid infeed is accomplished from the counter part and not from the sealing body.

Figure 4:
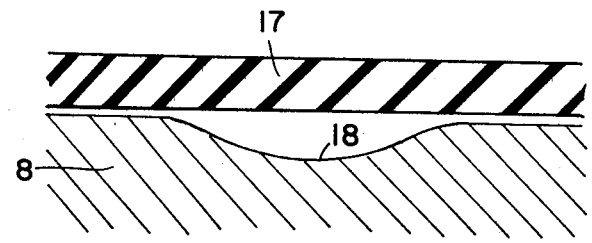
FIG. 4 is a fragmentary sectional view illustrating the groove for the seal arrangement of the embodiment of FIGS. 2a and 2b.

FIG. 4 shows in sectional view the shape of a groove 18 of the seal arrangement or seal constructed according to FIGS. 2a and 2b. The depth of such groove 18 can amount to, for instance, in the order of tenths of a millimeter, and the width can amount to several millimeters. Moreover, the optimum values for the dimensions of the groove depend upon the circumferential velocity and radius of the seal.

Figure 5:
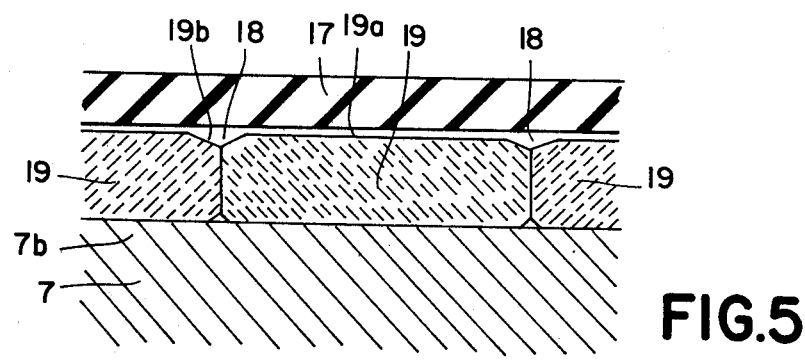
FIG. 5 illustrates in sectional view the ceramic bodies and grooves of a seal arrangement constructed according to the exemplary embodiment of FIGS. 3a and 3b.

FIG. 5 illustrates an analogous sectional view of an exemplary embodiment of a seal constructed according to the embodiment discussed previously with reference to FIGS. 3a and 3b. In this case the housing end portion or end 7b of the turbine housing 7 constitutes the counter part upon which there are mounted, for instance cemented, a plurality of ceramic body members or bodies 19. The contact or impact edges 19b of these ceramic bodies 19, with this exemplary embodiment, form the desired grooves 18 for the infeed of the friction-reducing liquid or fluid medium, as previously explained.

Figure 6:
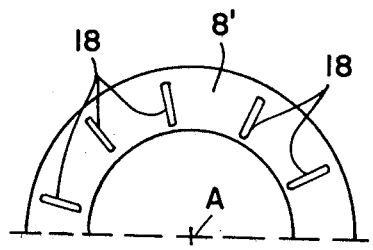
FIG. 6 illustrates a sealing surface equipped with radial grooves.

FIG. 6 illustrates a substantially circular ring-shaped or annular sealing surface 8' in front view and formed to extend about the lengthwise axis A of the turbine 1. Upon this sealing surface 8' there are provided at an equidistant spacing of several decimeters from one another the grooves 18 which extend essentially in radial direction.

This arrangement of the sealing surface 8' perpendicular to the lengthwise axis A has been found to be particularly favorable, however sealing surfaces arranged along a cylindrical jacket or shell or upon a cone about the axis A have also produced favorable results provided that the grooves located at the sealing surface possess a predominant directional component which extends in the shut-off direction of the water which is to be sealed, for instance in the axial direction.

Figure 7:
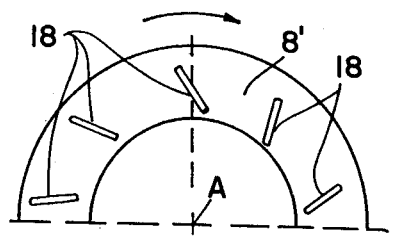
FIG. 7 illustrates a sealing surface equipped with inclined grooves.

FIG. 7 illustrates a similar sealing surface 8', wherein the grooves 18 here however do not extend radially rather at an inclination or obliquely. Such arrangement has been found to be favorable under certain conditions.

Figure 8:
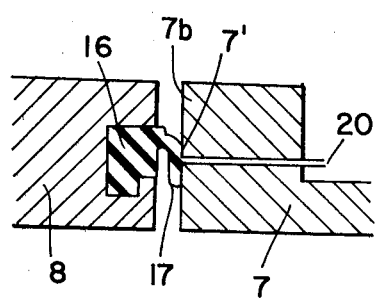
FIG. 8 illustrates in sectional view a seal arrangement wherein the friction-reducing liquid infeed is accomplished by means of bores.

FIG. 8 illustrates an exemplary embodiment of a seal arrangement or seal containing a sealing body 16 in the rim 8. The sealing body 16 is again constructed as a lip seal having a sealing lip 17 directed towards the medium which is to be blocked. In contrast to the preceding exemplary embodiments, in this case the infeed of the friction-reducing liquid to the sealing surface 7', here formed at the face of the housing end or end portion 7b, is not accomplished by grooves, rather by means of a bore 20 provided at the housing end portion 7b or housing 7, as the case may be, which defines the counter part. This bore 20 opens at the sealing surface 7' at a location where there contactingly bears the sealing lip 17. By means of this bore 20 the sealing surface 7' has infed thereto cleaned or purified fresh water, so that there can be avoided the penetration of contaminated water at the sealing surface 7', for instance water contaminated with foreign particles such as sand or grit. A premature wear of the sealing parts by sand particles or the like is therefore precluded.

Figure 9:
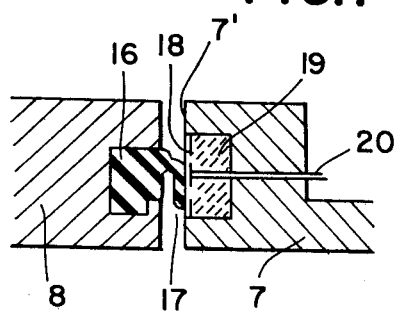
FIG. 9 illustrates a seal arrangement with ceramic bodies and the liquid infeed by means of bores.

FIG. 9 illustrates an analogous exemplary embodiment, wherein there are embedded ceramic body members 19 into the counter part 7. These ceramic bodies 19 are again provided with bores 20 which open at the sealing surface 7'.

The spacing of the bores 20, with both of the preceding described exemplary embodiments, should be selected such that there is realized an optimum lubrication and shut-off or blocking action of the liquid medium.

Figure 10:
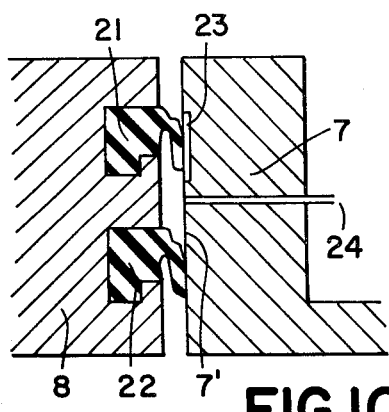
FIG. 10 illustrates a seal arrangement containing two sealing bodies or body members.

FIG. 10 illustrates an exemplary embodiment of a sealing system containing two sealing bodies 21 and 22 arranged at the rim or rim member 8. The sealing surface 7' of the housing 7 is again provided with grooves 23 at the site of the sealing body member 21 constituting a rear sealing body viewed in the shut-off or blocking direction, these grooves 23 being provided in the manner previously explained. A bore 24 or equivalent structure opens at the sealing surface 7' between both of the sealing bodies 21 and 22. Through the bore 24 there is infed water at an excess pressure and which is free of foreign particles or contaminants. Consequently, water contaminated with sand or grit is maintained away from the first or forwardmost sealing lip i.e. the sealing body member 22, and at the same time by the action of the excess pressure there is formed a lubricant film, so that the wear also is held at a modest level at such first sealing body or body member 22, and at the same time all of the foreign particles or contaminants are kept away from the rear sealing body or body member 21. Apart from acting as a trap or blocking device for the foreign particles or contaminants the front or forwardmost sealing body 22 simultaneously also serves as a standstill or shutdown seal, whose sealing lip, with the runner stationary, is pressed against the sealing surface 7', and thus, provides a practically leakage-free seal.

Figure 11:
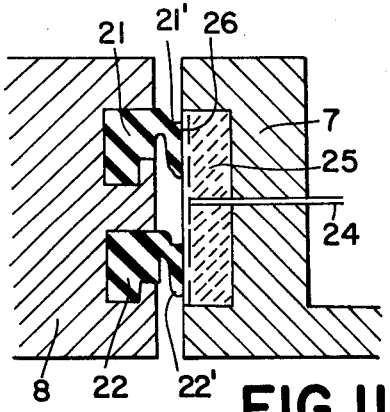
FIG. 11 illustrates a seal arrangement containing two sealing bodies and ceramic bodies.

FIG. 11 illustrates a similar exemplary embodiment containing two seaing bodies or body members 21 and 22, wherein, however, like in the embodiment of FIGS. 3a and 3b, again there are arranged at the counter part 7 ceramic bodies 25 having joint grooves 26 which extend over the entire length of both sealing lips 21' and 22' of the sealing bodies 21 and 22, respectively. The ceramic bodies 25 here also possess bores 24 for the infeed of water which is free of foreign particles or contaminants.

Figure 12:
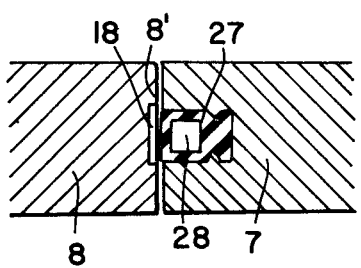
FIG. 12 illustrates a seal arrangement containing a hose sealing body.

With the variant construction of seal arrangement according to FIG. 12 there is used instead of a lip seal a hose seal 27, the interior or internal space 28 of which is pneumatically or hydraulically pressurized. The sealing surface 8' of the counter part 8 is again provided with grooves 18. The function is thus analogous to the embodiments having a lip seal, wherein, however, for sealing purposes there is used, instead of the excess pressure of the water which is to be sealed, an external excess pressure which is delivered to the internal space 28 of the hose seal 27.

Figure 13:
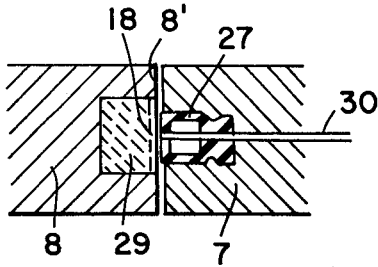
FIG. 13 illustrates a seal arrangement having a hose sealing body and ceramic body.

FIG. 13 illustrates a similar type of exemplary embodiment of sealing arrangement using a hose-like seal 27, wherein, here however, there are embedded in the sealing surface 8' ceramic bodies or body members 29 and the hose seal 27 is additionally provided with bores 30 by means of which there is again infed water free of contaminants or foreign particles.

Figure 14:
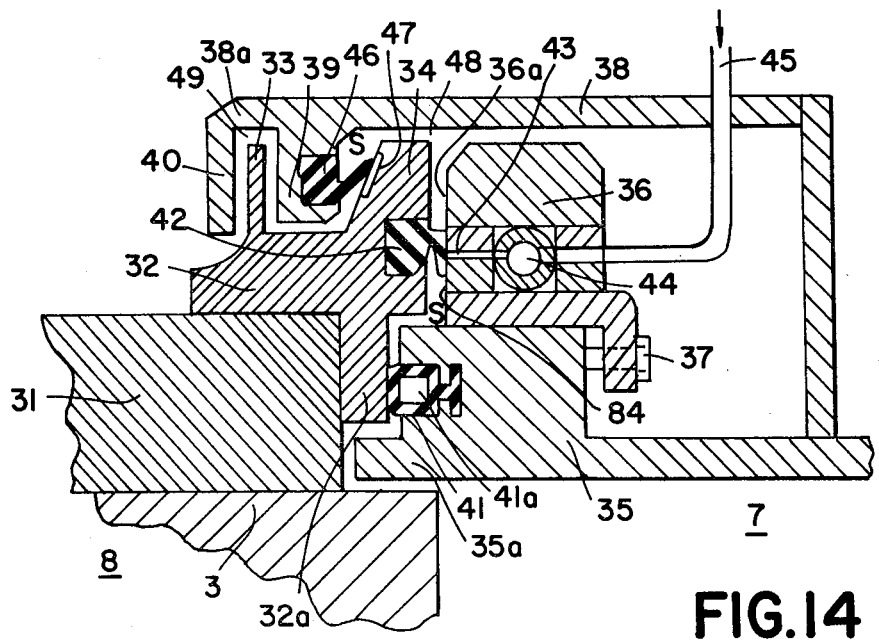
FIG. 14 illustrates in sectional view the outer rim of a tube turbine with different exemplary constructions of seals or sealing arrangements according to the invention.

FIG. 14 illustrates in detail a sealing arrangement at the outer rim 8 of a tube turbine. The rim 8 which is mounted upon the runner blading or blades 3 here comprises a substantially ring-shaped rim portion 31 upon which there is axially mounted, for instance threaded, bolted, welded or otherwise appropriately affixed, a respective ring element or part 32 provided with a shoulder 32a. This ring element 32 possesses at its outer circumference two substantially radially directed ring-shaped webs or prolongations 33 and 34. The turbine housing 7 consists of an inner tube element 35 which is provided at its end with a suitably machined portion 35a which possesses substantially the same shape as the oppositely situated surfaces of the rim portions of parts 31 and 32.

Mounted radially upon the housing portion or tube element 35 is a ring member 36 which is axially adjustable by means of a suitable positioning element 37, for instance a threaded bolt or equivalent structure, so that, there can be varied the spacing of its outer surface 36a from the ring element or part 32, and thus, the size of the seal gap. The housing portion or inner tube element 35 is surrounded at a certain spacing by a stationary jacket or shell 38 which is connected therewith, this shell or jacket 38 being provided at its free end 38a with two radially inwardly directed ring-shaped webs 39 and 40. These webs or web members 39 and 40 are arranged such that these webs 39 and 40 at the stationary part or shell 38 and the webs 33 and 34 at the rotating ring element or part 32 alternately are situated axially behind one another and there is thus formed a labyrinth-type seal gap S.

In this seal gap S there are arranged in succession, in the blocking or sealing direction, three sealing bodies. The first sealing body or body member 41 is constructed as a conventional expansible hose seal having an internal space 41a which is at excess pressure and serves, as previously described, as the stationary or standstill seal and the foreign particle-blocking device. The next seal 42 which follows in the fluid medium-blocking direction is constructed as lip seal in accordance with the embodiment described previously with regard to FIG. 8, and there opens at the related sealing surface 84 a bore 43 for the infeed of water free of foreign particles or contaminants. This bore 43 is supplied by an annular conduit or ring line 44 provided at the adjustable ring member or part 36 which infeeds, by means of a line or conduit 45, the cleaned or purified water. In the described manner, and just as was the case with the exemplary embodiment disclosed above with respect to FIG. 10, there is prevented the penetration of water containing foreign particles from the interior of the turbine into the sealing gap S. As the last sealing element or seal body, viewed in the shut-off or sealing direction, there is provided a lip seal 46 arranged in the substantially ring-shaped web or web member 39. This lip seal 46 coacts with grooves 47 provided at the ring-shaped web 34 in the above-described manner. The described arrangement of three seals arranged behind one another in the shut-off or sealing direction, wherein at least both of the rear seals are constructed according to the teachings of the invention, brings about an optimum sealing action with minimum frictional losses, particularly a longer service life of the sealing elements and reduced wear, and there also can be compensated greater tolerances between mutually moved parts or elements. The leakage is extremely slight. Due to the arrangement of the ring-shaped webs 34, 39, 33 and 40 at the stationary and rotating parts next to one another, as described above, there are additionally formed the pockets 48 and 49 where there can be propelled away and entrapped the leakage water during rotation of the rim 8, which leakage water has penetrated through the seal arrangement, so that there is practically completely avoided entry of such leakage water into the outer region where there is arranged the electrical generator.

It is here remarked that the invention described herein, by way of example and not limitation, in conjunction with a water turbine, especially an outer rim-tube turbine, is not limited in any way to such exemplary environment or field of use, rather the teachings of the invention can be employed in analogous fashion also in the case of turbo-machines of different construction while carrying out any thus required modifications or adaptations of the invention as will suggest themselves to those skilled in this art and without departing from the underlying principles and concepts of the present invention.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A hydro-electric turbo-machine comprising:

a stationary housing;

a rotor arranged for rotational movement within said stationary housing;

at least one substantially ring-shaped sealing means for sealing water flowing through the turbo-machine between predetermined parts of the rotor and the stationary housing;

one of said parts serving as a rigid counter part which possesses a sealing surface;

said sealing means comprising at least one sealing body embedded in the other part and formed of resilient material;

said at least one sealing body being pressed against said sealing surface; and said rigid counter part being structured such that its sealing surface has infed thereto from said rigid counter part a friction-reducing liquid medium to said sealing surface thereof.

2. The hydro-electric turbo-machine as defined in claim 1, wherein:

said friction-reducing liquid medium comprises water which is to be sealed.

3. The hydro-electric turbo-machine as defined in claim 1 or 2, wherein:

said counter part is provided with groove means at the region of its sealing surface; and said groove means possessing a direction of extent having a predominant component extending substantially in a predetermined shut-off direction of the water which is to be sealed.

4. The hydro-electric turbo-machine as defined in claim 3, wherein:

said sealing surface comprises a substantially ring-shaped surface disposed substantially perpendicular to a lengthwise axis of the turbo-machine; and said groove means possessing a predominantly radial directional component.

5. The hydro-electric turbo-machine as defined in claim 3, wherein:

said sealing surface is located at a substantially cylindrical jacket surface; and said groove means possessing a predominantly axial directional component.

6. The hydro-electric turbo-machine as defined in claim 1, wherein:

said friction-reducing liquid medium comprises a liquid medium freed of contaminants.

7. The hydro-electric turbo-machine as defined in claim 6, wherein:

said liquid medium is water.

8. The hydro-electric turbo-machine as defined in claim 6, further including:

bore means provided for the counter part; and said bore means opening at the sealing surface and serving for the infeed of the friction-reducing liquid medium at an excess pressure.

9. The hydro-electric turbo-machine as defined in claim 1, wherein:

said sealing body is structured as a lip seal having a sealing lip;

said sealing lip being pressed by its inherent elasticity against said sealing surface; and said sealing lip having a free end directed towards the water which is to be sealed.

10. The hydro-electric turbo-machine as defined in claim 1, wherein:

said sealing body is structured as a lip seal having a sealing lip; and said sealing lip being pressed by a spring insert against said sealing surface and having a free end directed towards the water which is to be sealed.

11. The hydro-electric turbo-machine as defined in claim 1, wherein:

said sealing body is structured as a lip seal having a sealing lip; and said sealing lip being pressed by the water which is to be sealed against said sealing surface and having a free end directed towards the water which is to be sealed.

12. The hydro-electric turbo-machine as defined in claim 1, wherein:

said sealing body is structured as a hose seal possessing an internal space which is at an excess pressure.

13. The hydro-electric turbo-machine as defined in claim 1, wherein:

only said rigid counter part is structured such that its sealing surface has infed thereto from said rigid counter part a friction-reducing liquid medium to said sealing surface thereof.

14. A hydro-electric turbo-machine comprising:

a stationary housing;

a rotor arranged for rotational movement within said stationary housing;

at least one substantially ring-shaped sealing means for sealing water flowing through the turbo-machine between predetermined parts of the rotor and the stationary housing;

one of said parts serving as a rigid counter parts which possesses a sealing surface;

said sealing means comprising at least one sealing body embedded in the other part and formed of resilient material;

said at least one sealing body being pressed against said sealing surface;

said counter part being structured such that its sealing surface has infed thereto from said counter part a friction-reducing liquid medium;

said counter part is provided with groove means at the region of its sealing surface;

said groove means possessing a direction of extent having a predominant component extending substantially in a predetermined shut-off direction of the water which is to be sealed;

ceramic body members provided for said counter part;

said ceramic body members having surfaces forming said sealing surface; and said ceramic body members having joint edges and the joint edges of neighboring ceramic bodies forming said groove means.

15. A hydro-electric turbo-machine comprising:

a stationary housing;

a rotor arranged for rotational movement within said stationary housing;

at least one substantially ring-shaped sealing means for sealing water flowing through the turbo-machine between predetermined parts of the rotor and the stationary housing;

one of said parts serving as a rigid counter part which possesses a sealing surface;

said sealing means comprising at least one sealing body embedded in the other part and formed of resilient material;

said at least one sealing body being pressed against said sealing surface;

said counter part being structured such that its sealing surface has infed thereto from said counter part a friction-reducing liquid medium;
said friction-reducing liquid medium comprises a liquid medium freed of contaminants;
bore means provided for the counter part;
said bore means opening at the sealing surface and serving for the infeed of the friction-reducing liquid medium at an excess pressure; and
said bore means being provided at ceramic body members embedded in said counter part.

16. A hydro-electric turbo-machine comprising:
a stationary housing;
a rotor arranged for rotational movement within said stationary housing;
at least one substantially ring-shaped sealing means for sealing water flowing through the turbo-machine between predetermined parts of the rotor and the stationary housing;
one of said parts serving as a rigid counter part which possesses a sealing surface;
said sealing means comprising at least one sealing body embedded in the other part and formed of resilient material;
said at least one sealing body being pressed against said sealing surface;
said counter part being structured such that its sealing surface has infed thereto from said counter part a friction-reducing liquid medium;
said friction-reducing liquid medium comprises a liquid medium freed of contaminants;
bore means provided for the counter part;
said bore means opening at the sealing surface and serving for the infeed of the friction-reducing liquid medium at an excess pressure; and
said bore means opening at ceramic body members attached to the counter part.

17. A hydro-electric turbo-machine comprising:
a stationary housing;
a rotor arranged for rotational movement within said stationary housing;
at least one substantially ring-shaped sealing means for sealing water flowing through the turbo-machine between predetermined parts of the rotor and the stationary housing;
one of said parts serving as a rigid counter part which possesses a sealing surface;
said sealing means comprising at least one sealing body embedded in the other part and formed of resilient material;
said at least one sealing body being pressed against said sealing surface;
said counter part being structured such that its sealing surface has infed thereto from said counter part a friction-reducing liquid medium;
a sealing body member arranged forwardly of said sealing body in a predetermined sealing direction for the water; and
said sealing body member serving as a shutdown seal arrangement and as a blocking device for blocking entry of foreign particles.

18. The hydro-electric turbo-machine as defined in claim 17, wherein:
both said sealing body and said sealing body member are arranged so as to form therebetween an intermediate space where the pressure therein is at least equal to the pressure of the water which is to be sealed.

19. The hydro-electric turbo-machine as defined in claim 18, further including:
infeed means for the infeed of the friction-reducing liquid medium at an excess pressure; and
said infeed means opening between said sealing body and said sealing body member.

20. The hydro-electric turbo-machine as defined in claim 18, further including:
infeed means for the infeed of the friction-reducing liquid medium at an excess pressure; and
said infeed means opening at the site of a rear sealing body with regard to a predetermined shut-off direction for the water.

21. The hydro-electric turbo-machine as defined in claim 19 or 20, wherein:
said infeed means for the friction-reducing liquid medium opens into the sealing surface of the counter part.

22. A hydro-electric turbo-machine comprising:
a stationary housing;
a rotor arranged for rotational movement within said stationary housing;
at least one substantially ring-shaped sealing means for sealing water flowing through the turbo-machine between predetermined parts of the rotor and the stationary housing;
one of said parts serving as a rigid counter part which possesses a sealing surface;
said sealing means comprising at least one sealing body embedded in the other part and formed of resilient material;
said at least one sealing body being pressed against said sealing surface;
said counter part being structured such that its sealing surface has infed thereto from said counter part a friction-reducing liquid medium;
a substantially ring-shaped web member arranged in a predetermined shut-off direction for the water behind a sealing body of a rotating element constituted by one of said parts for propelling-out leakage liquid medium; and
said web member engaging into a catch trough at a stationary element constituted by the other of said parts and opening towards a lengthwise axis of the turbo-machine.

23. The hydro-electric turbo-machine as defined in claim 22, wherein:
said catch trough is arranged in a predetermined shut-off direction for the water between two sealing bodies.

* * * * *